US006929218B1

(12) United States Patent
Sanford et al.

(10) Patent No.: US 6,929,218 B1
(45) Date of Patent: Aug. 16, 2005

(54) MODULARIZED INTEGRATED AIRCRAFT SEAT STRUCTURE

(75) Inventors: William C. Sanford, Mukilteo, WA (US); Shawn Claflin, Lake Stevens, WA (US); Mark E. Wentland, Lynnwood, WA (US); Bradley J. Mitchell, Snohomish, WA (US); Kevin S. Callahan, Shoreline, WA (US); Trevor Laib, Woodinville, WA (US); James A. Fullerton, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/708,857

(22) Filed: Mar. 29, 2004

(51) Int. Cl.[7] .............................................. B64D 11/06

(52) U.S. Cl. .............................. 244/118.5; 244/122 R; 297/180.14

(58) Field of Search ................. 244/118.5; 725/76–82; 700/83; 485/3.06; 361/681, 683; 297/180.14; 340/10.1; 702/94

(56) References Cited

U.S. PATENT DOCUMENTS

| 4,647,980 | A | * | 3/1987 | Steventon et al. | .......... 348/837 |
|---|---|---|---|---|---|
| 4,897,714 | A | * | 1/1990 | Ichise et al. | ................... 725/76 |
| 5,311,302 | A | * | 5/1994 | Berry et al. | ............. 348/14.03 |
| 5,640,297 | A | * | 6/1997 | Labaze | ........................ 361/683 |
| 5,835,127 | A | * | 11/1998 | Booth et al. | ................... 725/76 |
| 6,048,024 | A | * | 4/2000 | Wallman | ............... 297/180.14 |
| 6,249,913 | B1 | * | 6/2001 | Galipeau et al. | .............. 725/76 |
| 6,473,704 | B1 | * | 10/2002 | Ito et al. | ....................... 702/94 |
| 6,509,829 | B1 | * | 1/2003 | Tuttle | ........................ 340/10.1 |

* cited by examiner

Primary Examiner—Galen Barefoot
(74) Attorney, Agent, or Firm—Thomas E. Donohue; Artz & Artz, P.C.

(57) ABSTRACT

An aircraft is provided comprising a fuselage and a central monitoring system positioned within the fuselage. A plurality of seating elements is also positioned within said fuselage. Each of the plurality of seating elements includes a plurality of seat options integrated into the seating element and an electronics control system integrated into the seating element. The electronics control system includes a seat processor having logic adapted to monitor an operational status of each of the seat options and communicate the operational status to the central monitoring system via wireless communication.

40 Claims, 4 Drawing Sheets

US 6,929,218 B1

MODULARIZED INTEGRATED AIRCRAFT SEAT STRUCTURE

BACKGROUND OF INVENTION

The present invention relates generally to an aircraft seat structure and more particularly to a method for integrating a modularized aircraft seat into an aircraft structure for improved performance and communication.

Commercial airplane interiors are presently developed with a wide-array of various types of electronics and options available to seated passengers. Many newer systems incorporate in-flight entertainment, communications, gaming and audio. In addition, traditional options such as seat adjustment, tray tables, climate control, and lighting are installed. The result of such plurality of systems available to passengers is commonly that complex and costly wiring schemes must be configured into the plane's fuselage in order to provide control of these functions.

In addition, it is common for the status of many of these passenger-controlled functions to be verified prior to aircraft takeoff and landing. Present compliance is commonly accomplished through the physical verification by airline staff in pre-flight and pre-landing checks. This consumes considerably time and energy. Known system address some concerns such as seat position and tray table through the use of sensors wired into a master control panel to report status to the crew. These systems, however, require extensive rewiring of the aircraft fuselage and may provide serious maintenance concerns. Additionally, these known systems are inflexible and difficult to add increased functionality to. As a new function added to the seat would require additional routed wiring to the control panel, cost effectively limits the ability to upgrade such systems.

It would, therefore, be highly desirable to have a design for a modular aircraft seat assembly that would allow for an upgradeable seat assembly with simple installation into the fuselage. Such a design would have the benefit of allowing for seat upgrade without requiring a rewiring of the fuselage. Furthermore, such as system would allow for an improved range of monitoring of the aircraft interior status without physically altering the interior structure. Finally, such a modular seating design could be used to move the majority of passenger convenience and safety features into the aircraft seat. In this fashion, overhead storage could be improved and seating technology could be improved.

It would additionally be highly desirable to have an improved method of communicating aircraft readiness for takeoff to cabin crews to reflect operational status, tampering, functional status, or passenger count without requiring physical inspection of the cabin.

SUMMARY OF INVENTION

It is therefore an object to the present invention to provide an aircraft with improved seat operational status communication. It is further object of the present invention to provide a method for reducing the complexity of pre-flight checks on operational and functional status of seat options.

In accordance with the objects of the present invention an aircraft is provided. An aircraft comprises a fuselage and a central monitoring system positioned within the fuselage. A plurality of seating elements is also positioned within said fuselage. Each of the plurality of seating elements includes a plurality of seat options integrated into the seating element and an electronics control system integrated into the seating element. The electronics control system includes a seat processor having logic adapted to monitor an operational status of each of the seat options and communicate the operational status to the central monitoring system via wireless communication.

Other objects and features of the present invention will become apparent when viewed in light of the detailed description and preferred embodiment when taken in conjunction with the attached drawings and claims.

DETAILED DESCRIPTION

Figure 1:
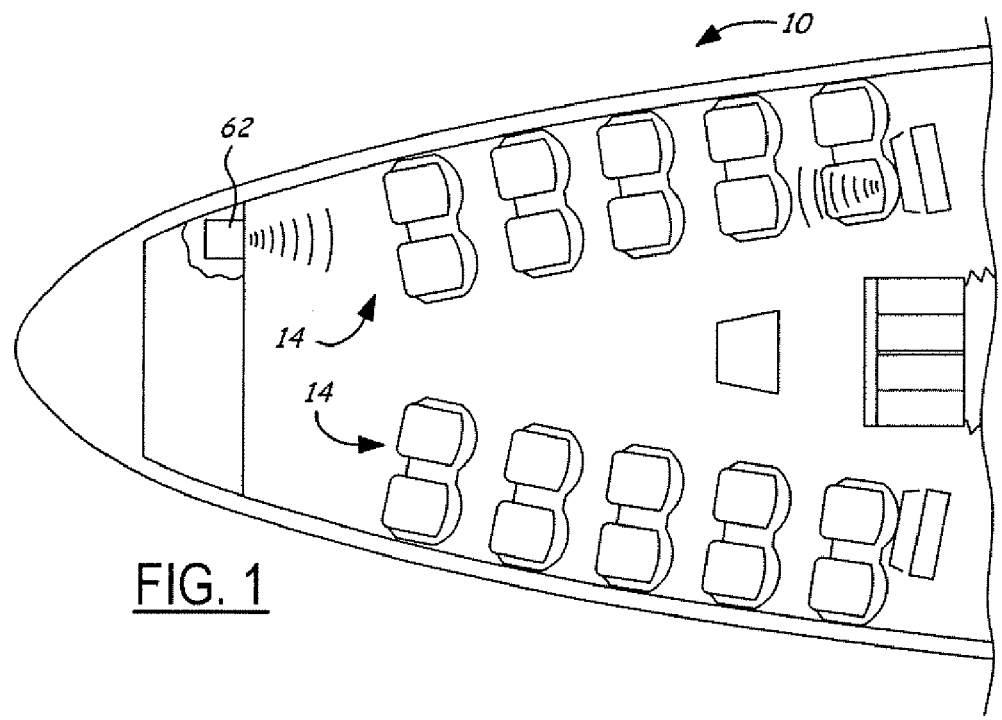
FIG. 1 is an illustration of an aircraft assembly in accordance with the present invention, the aircraft assembly illustrated incorporating a plurality of modular integrated aircraft seats.

Referring now to FIG. 1, which is an illustration of an aircraft 10 in accordance with the present invention. The overall configuration of the aircraft 10 is for illustrative purposes only and is not intended to generate limitations on the present invention. The aircraft 10 includes a fuselage 12 containing a plurality of seat elements 14 mounted within the aircraft interior 16. It is well known that existing aircraft interiors 16 present a host of challenges to both designers and aircraft cabin crews. Regulations commonly require than many of the functions each of the plurality of seat elements 14 must be placed in a specific operating condition prior to takeoff and landing. Verification is commonly accomplished through visual inspection by the cabin crew. Additionally, known automated systems commonly utilized complex wiring schemes throughout the fuselage 12 that contribute undesirable cost, weight, and complexity to the aircraft design and maintenance.

Figure 2:
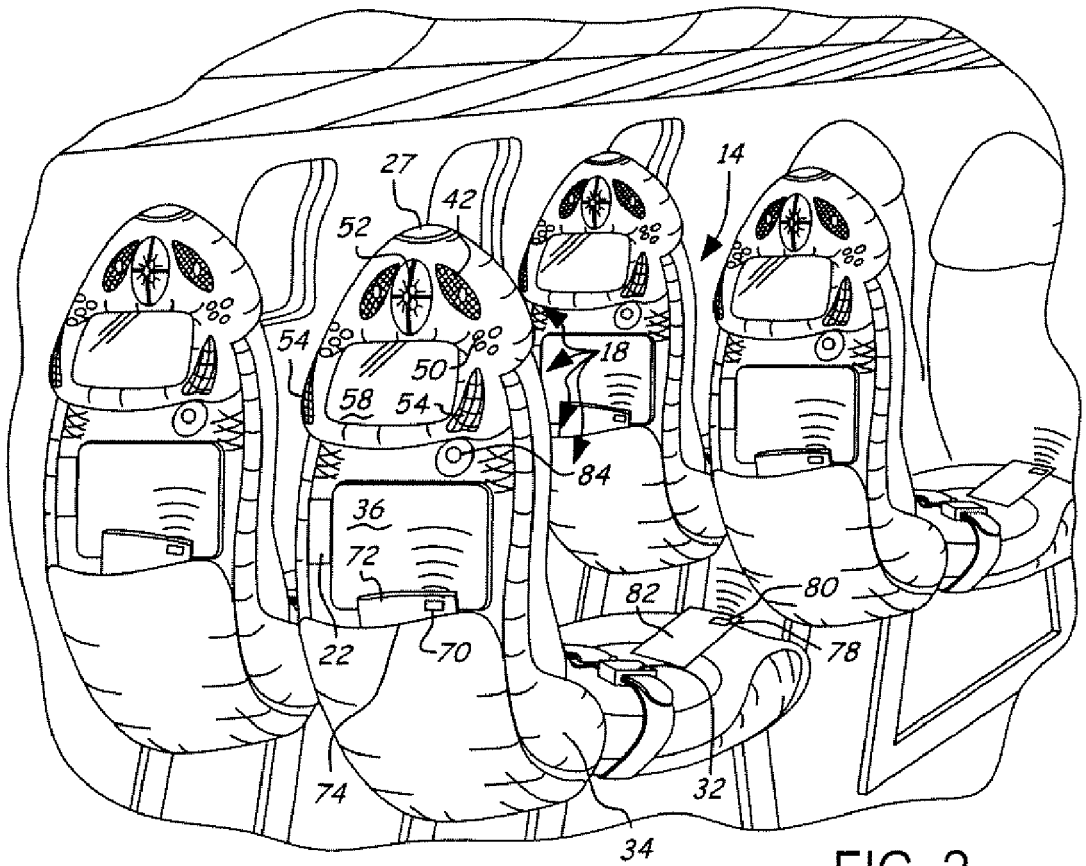
FIG. 2 is a detailed illustration of the modular integrated aircraft seats illustrated in FIG. 1.
Figure 6:
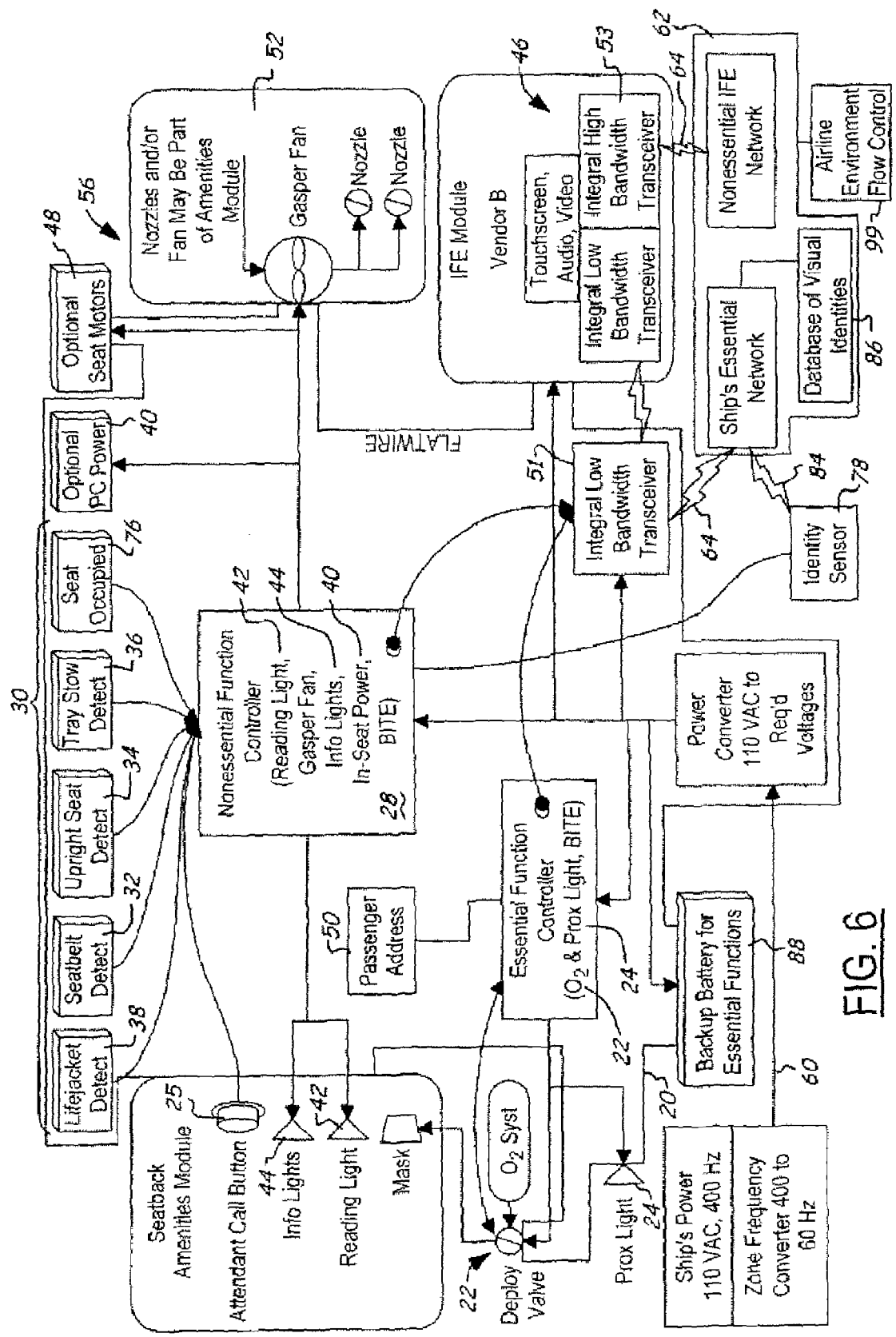
FIG. 6 is a system layout of the functionality of the modular integrated aircraft seat illustrated in FIG. 2.

The present invention provides a unique and beneficial solution to these concerns. It does so by providing a unique structure for the seat elements 14 as well as their interaction with a broader monitoring assembly. This is accomplished by including in each seat element 14 a plurality of modular seat options 18 integrated into the seat element 14 (see FIG. 2). The modular seat options 18 are intended to encompass flight essential seat options 20 (see FIG. 6) such as passenger supplemental oxygen deployment 22, proximity lighting 24, attendant call button 25, attendant call signal light 27, and built-in test equipment 26. The modular seat options 18 are further intended to include non-essential seat options 28 such as detection components 30 (i.e. seatbelt detect 32, upright seat detect 34, tray stow detect 36, and tampering detect 38 for items such as lifejackets), optional power supply 40 such as for computers, in-seat reading lights 42, information lights 44, in-seat entertainment 46, seat controls 48, passenger address 50, and gasper fan 52. By installing these seat options 18 as modular components within the seating element 14, the present invention generates a multifunction single installable component seat element 14 that contains a wide variety of function commonly requiring independent installation throughout the aircraft interior 16. By moving options such as the gasper fan 52, reading light 42, and passenger supplemental oxygen deployment 22 into the seat element 14, overhead compartment space is increased enabling other interior amenities or interior design options. In addition, a central location for options is generated. One embodiment contemplates the mounting of both the gasper fan 44 and fresh air intakes 54 such that a self-contained environmental component is contained within each seat element 14.

Thus the present invention comprises an electronics control system 56 integrated into each of the plurality of seat elements 14. Each of the plurality of seat options 18 is placed in communication with the electronics control system 56 such that each seating element 14 contains its own processing intelligence in order to control these modular seat options 18. This in turn, allows additional modules to be added or modules to be modified without requiring remodification of significant portions of the aircraft interior 16. Furthermore, the electronics control system 56 provides a single programmable control by which modules may be added or subtracted without complex rewiring of the seat element 14. Control elements, such as a touch screen 58 provide easy control for passengers as well as easily upgradeable control features. On of the largest benefits stems from the fact that it is contemplated that the electronics control system 56 includes logic adapted to monitor the operational status of each of the seating options 18. This is intended to include seat position 34, tray table position 36, seatbelt lock 32, etc. The electronics control system 56 can further monitor functional status such as failure or tampering. By providing monitoring and control logic to the electronics control system 46 positioned in each seating element 14, the present invention allows each seating element 14 to be electronically connected to the fuselage 12 using only a ship power connection 60 rather than complex control wiring for each option through the fuselage 12.

Figure 3:
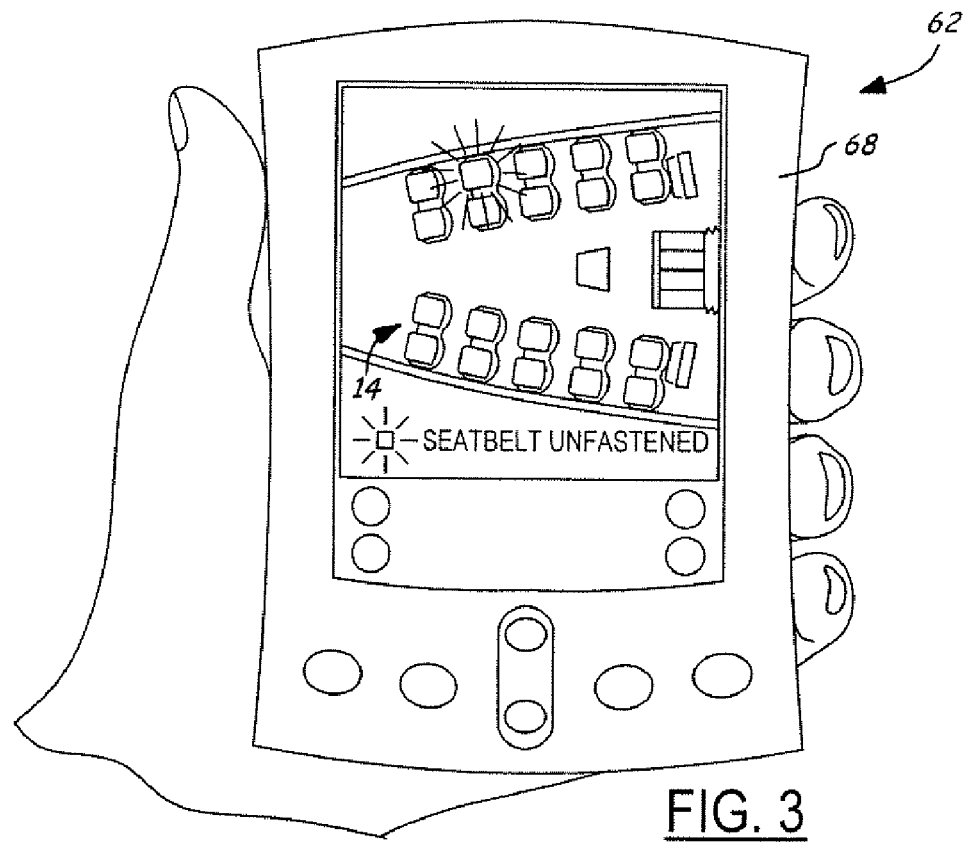
FIG. 3 is a close-up detail of one embodiment of a central monitoring system for use in the aircraft assembly illustrated in FIG. 1.
Figure 4:
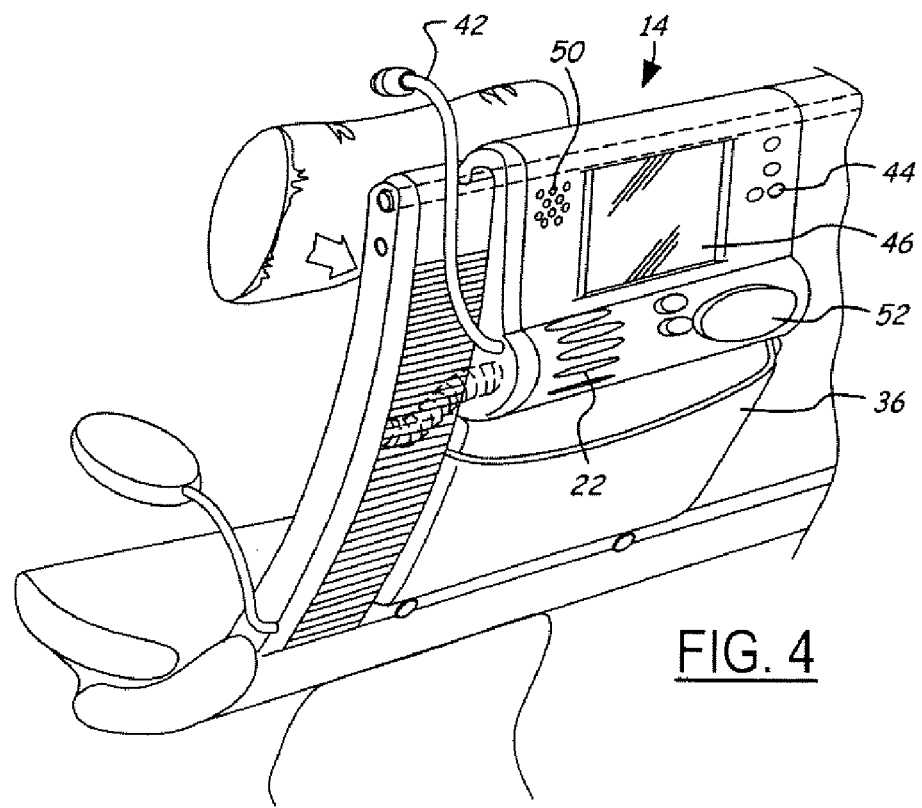
FIG. 4 is a detailed illustration of the construction of the modular integrated aircraft seat illustrated in FIG. 2.
Figure 5:
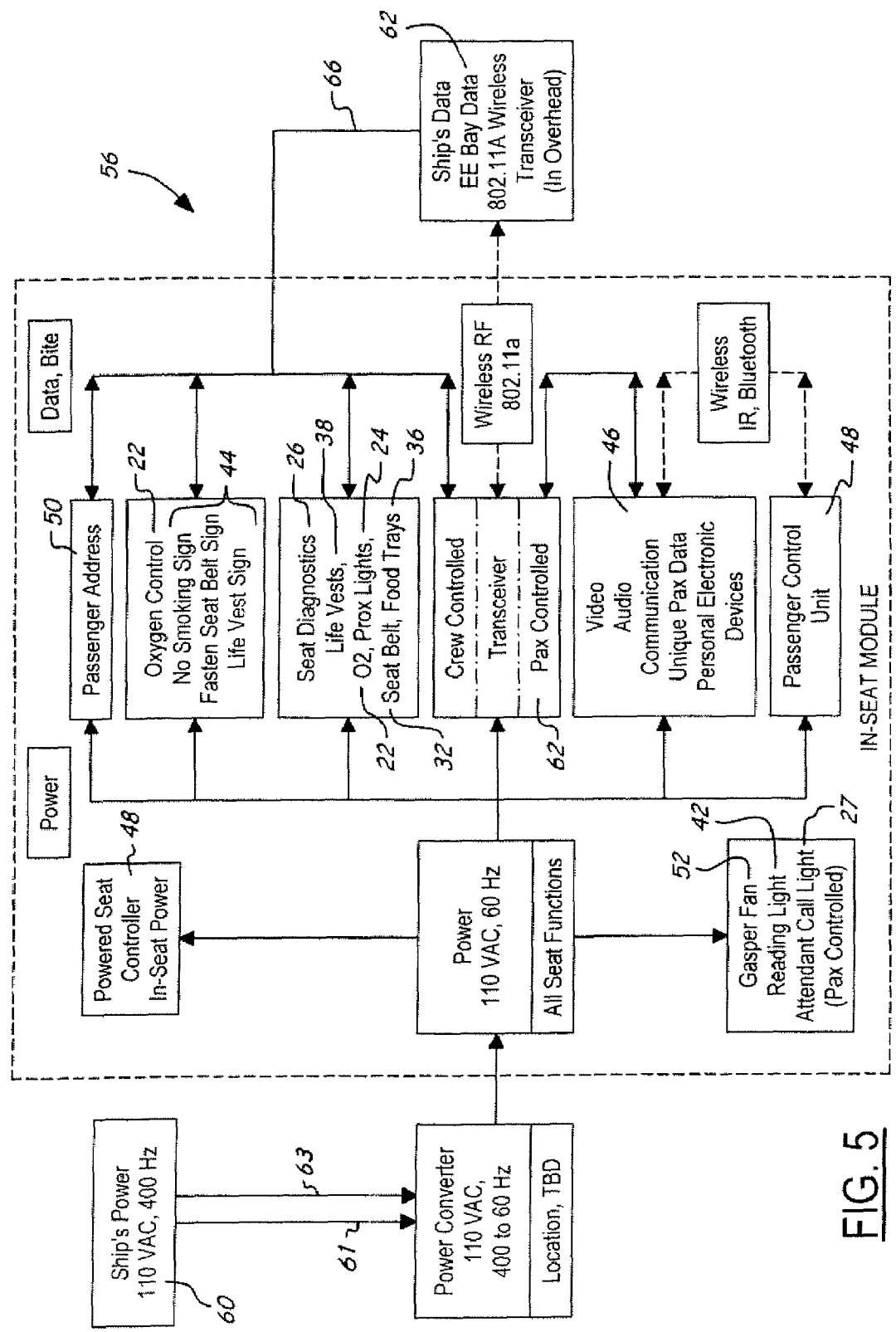
FIG. 5 a block diagram of an electronics control system for use in the modular integrated aircraft seat of the aircraft assembly illustrated in FIG. 2.

The present invention further improves the simplicity of modular modification, modular installation, and control by including in the electronics control system 56 logic adapted to communicate with a central monitoring system 62 across a single pathway. Namely through either wireless communication 64 or through a single communications bus line 66 wherein the operational status or functional status can be communicated. Thus if additional modular seat options 20 are added, removed, or altered, only the electronics control system 56 and central monitoring system 62 need be reprogrammed. No rewiring of the fuselage 12 is required. This allows a freedom of design and modification missing from aircraft design. Additionally, in one embodiment it is contemplated that the central monitoring system 62 comprises a handheld portable wireless device 68 (see FIG. 3) such as a PDA. In such an embodiment, cabin crew can quickly and easily identify improper operational status or functional status of modular seat options 20 prior to takeoff or landing. In addition, by providing a visual representation of the aircraft interior 16, the attendants can isolate exactly which passengers have not (for example) placed their seat back 14 in an upright position, seatbelt engaged 32, raised the tray table 36, life vest tampered 38, or any modular system failure. This can be done wireless from a convenient seating or mobile position of the cabin crew without the manual inspections. Additionally, detection of improper operational status of the seat can be used to drive a seat-mounted visual indication (such as information 44 or attendant call signal lighting 27 lights). This saves time and effort and may speed up pre-flight delays. In other embodiments, however, the central monitoring system 62 may represent a conventional computer system positioned in any crew accessible location throughout the aircraft 10. It is contemplated that with wireless communication 64 the present invention may utilized both an integral low bandwidth receiver 51 for status information, separate from any integral high band width transceiver 53 for in-seat entertainment 46. This allows seat options 18 and in-seat entertainment 46 to be independently controlled.

In one embodiment, the present invention contemplates that the passenger address 50 comprises logic within the electronics control system 56 to generate or accept personalized instructions. In this fashion, when a passenger's seat options 20 are not in compliance with regulations for takeoff, the passenger can be so informed personally from the personalized passenger address 50 rather than requiring a crew member to personally walk to his seat. In one embodiment, the electronics control system 56 can generate the instructions, while in another the instructions can be relayed to the electronics control system 56 from the central monitoring system 62 through the use of a bi-directional data link. Thus an improved control over takeoff and landing compliance can be achieved quickly. In another embodiment, the present invention contemplates the placement of a wireless literature tag 70 (such as an RF tag) within aircraft literature 72 placed within the pockets 74 of each seating element 14. The electronics control system 56 contains logic to monitor the presence of this aircraft literature 72 by receiving the signal from the wireless literature tag 70. This again allows cabin crew to verify proper pre-flight arrangements without requiring a personalized visual inspection of the cabin.

It is contemplated that the present invention may further include logic adapted to sense seat occupation 76 integrated into the electronics control system 56. It is contemplated that this may be accomplished in a variety of fashions such as infra-red sensors, weight sensors, contact thermocouples, and obscuration illumination of fluorescent fabrics. In one preferred embodiment, however, seat occupation 76 is determined using an identity sensor 78. One such identity sensor 78 is contemplated to represent a wireless passenger identification tag 80 affixed to a boarding pass 82. It should be understood that the boarding pass 82 is intended to encompass any airline issued identification. The logic is adapted to identify the passenger based on the wireless passenger identification tag 80. This allows precise passenger positioning to be monitored by cabin crew, security personnel or other airline personnel. In addition, in another embodiment wherein a vision system 84 is used as the identity sensor 78, the visual identity 85 of each passenger can be sent to the central monitoring system 62 and compared to a database of visual identities 86 to identify the passenger or look for specific passengers.

Although the seat occupation 76 may be utilized for the above security and passenger monitoring applications, the present invention further envisions its usage in combination with the electronics control system 56 in order to conserver airline power economy. The electronics control system 56 preferably contains logic adapted to remove power from non-essential seat options when the seat element 14 is unoccupied. In this fashion, the aircraft 10 automatically minimizes power consumption by routing such power only to seating elements 14 actually housing passengers. This novel approach still leaves power for safety and essential seating options 20 such as oxygen deployment 22 and proximity lighting 24. A battery back-up 88 positioned within each seating element 14 and in communication with the electronics control system 56 ensures essential seating options 20 will properly function even when main power is interrupted. Alternatively, separate essential 61 and non-essential power 63 can be supplied to the seat from the airplane power supply 60 with nonessential power shed at the airplane power supply as appropriate. It is further envisioned that the electronics control system 56 within each seating element 14 can be programmable so as to receive programming instructions from the central monitoring system 62. In this way, when new components, security measures, or energy saving algorithms are developed, they may be distributed to the plurality of electronics control systems 56 within the fuselage 12 by simply loading the changes into the central monitoring system 62. For example, the central monitoring system 62 can command all gasper fans in the airplane can be set to the off position prior to passenger boarding.

In operation, the present invention would operate in a fashion similar to the below. Pre-flight operational status would be sent to the central monitoring system 62 insuring cabin crew that no safety equipment had been tampered with 38, that airline literature 72 was present in each seat 14, and that all seating elements 14 were functioning properly. Passengers would then be allowed to board. The central monitoring system 62 would send out a desired status such as tray tables up, seats upright, and seatbelts fastened. Each electronics control system 56 would receive this desired status and compare it to the operational status of its own seating element 14. Should desired status and operational status fail to match, the electronics control system 56 can generate personalized instruction to change the operational status to the desired status and convey these instructions to the passenger in question. Passenger identification 80 can be determined from a passenger identification signal such as from a wireless transmitter 80 embedded in a boarding pass 82. This can be monitored by the electronics control system 56 and reported to the central monitoring system 62 allows for an efficient monitoring of proper passenger position and identity. Seat occupation 76 can be monitored such that power can be removed from non-essential seat options 28 in unoccupied seating elements 14. Furthermore, data on which seats within a zone of the cabin are occupied could be used by other aircraft systems such as the aircraft environmental control system 99. Having data on where passengers are seated can be used to optimize the balancing of airflow within that zone and throughout the aircraft thus increasing the efficiency of that system while potentially reducing its size and cost.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An aircraft comprising:
   a fuselage;
   a central monitoring system positioned within said fuselage;
   a plurality of seating elements positioned within said fuselage, each of said plurality of seating elements comprising:
   a plurality of seat options integrated into said seating element; and
   an electronics control system integrated into said seating element, said electronics control system including a seat processor having logic adapted to:
   monitor an operational status of each of said seat options;
   communicate said operational status to said central monitoring system via wireless communication; and
   logic adapted to generate personalized instructions regarding said operational status of said seat options.

2. An aircraft as described in claim 1, wherein said electronics control system comprises:
   an essential network transmitter communicating said operational status of essential seat options; and
   a non-essential network transmitter communicating said operational status of nonessential seat options.

3. An aircraft as described in claim 1, wherein said central monitoring system comprises:
   a portable wireless device.

4. An aircraft as described in claim 1, wherein said seat processor logic is further adapted to:
   provide electronic controls to said seat options.

5. An aircraft as described in claim 4, further comprising:
   a touchscreen in communication with said electronics control system, said touchscreen mounted within said seating element and providing user adjustment of said seat options.

6. An aircraft as described in claim 1, further comprising:
   a seat mounted visual indication mounted to said seating element, said seat mounted visual identification in communication with said electronics control system said seat mounted visual indication indicating said operational status.

7. An aircraft as described in claim 1, further comprising:
   a battery backup assembly in communication with said electronics control system, said battery backup assembly mounted within said seat element.

8. An aircraft as described in claim 1, further comprising:
   built in test equipment functionality integrated into said electronics control system, said built in test equipment functionality providing functional status of said seat options, said electronics control system communicating said functional status to said central monitoring system.

9. An aircraft as described in claim 8, wherein said built in test equipment further comprises:
   tampering logic adapted to monitor tampering of safety equipment.

10. An aircraft as described in claim 1, wherein said seat processor further comprises:
    logic adapted to receive programming instructions from said central monitoring system.

11. An aircraft as described in claim 1, wherein said seat processor further comprises:
    logic adapted to reduce power consumption by removing power from nonessential seat options.

12. An aircraft as described in claim 11, wherein said seat processor further comprises:
    logic adapted to sense seat occupation, said logic removing power from non-essential seat options when said seat element is unoccupied.

13. An aircraft as described in claim 1, further comprising:
    a wireless literature tag affixed to aircraft literature stored within said seat element; and
    logic adapted to monitor presence of said aircraft literature, said logic integrated into said seat processor.

14. An aircraft as described in claim 1, wherein said seat processor further comprises:
  logic adapted to identify a passenger seated within said seat element.

15. An aircraft as described in claim 13, further comprising:
  a wireless passenger identification tag affixed to a boarding pass; and
  logic adapted to identify said passenger based on said wireless passenger identification tag.

16. An aircraft as described in claim 14, further comprising:
  a vision system integrated into said seat element, said vision system in communication with said electronics control system, said vision system storing a visual identity of said passenger, said electronics control system communicating said visual identity to said central monitoring system.

17. An aircraft as described in claim 15, wherein said central monitoring system compares said visual identity to a database of visual identities to identify said passenger.

18. An aircraft as described in claim 1, wherein said seat options include a gasper fan mounted within said seat element.

19. An aircraft as described in claim 1, wherein each of said plurality of seat elements can be electrically connected to said fuselage using only a ship power connection.

20. An aircraft as described in claim 19, wherein said ship power connection comprises:
  an essential ship power connection; and
  a non-essential ship power connection.

21. An aircraft as described in claim 1 further comprising:
  logic adapted to sense seat occupation; and
  an airline environmental flow control in communication with said central monitoring system, said airline environmental flow control adjusting environmental flow in response to said seat occupation.

22. An aircraft comprising:
  a fuselage;
  a central monitoring system positioned within said fuselage;
  a plurality of seating elements positioned within said fuselage, each of said plurality of seating elements comprising:
  a plurality of modular seat options integrated into said seating element; and
  an electronics control system integrated into said seating element, said electronics control system including a seat processor having logic adapted to;
  monitor an operational status of each of said modular seat options;
  provide control functions to each of said modular seat options;
  built in test equipment functionality integrated into said electronics control system, said built in test equipment functionality providing functional status of said modular seat options, said electronics control system communicating said functional status to said central monitoring system; and
  communicate said operational status to said central monitoring system.

23. An aircraft as described in claim 22, wherein said electronics control system communicates with said central monitoring system via a universal transmission bus network line.

24. An aircraft as described in claim 22, wherein said seat processor logic is upgradeable from within said seat element to accommodate new modular seat options.

25. An aircraft as described in claim 22, wherein said electronics control system communicates with said central monitoring system via a wireless communication network.

26. An aircraft as described in claim 22, wherein said modular seat options include:
  a gasper fan assembly integrated into a back seat portion of said seating element.

27. An aircraft as described in claim 26, wherein said modular seat options include:
  fresh air intakes integrated into a back seat portion of said seating element, said fresh air intakes in communication with said gasper fan assembly.

28. An aircraft as described in claim 22, wherein said central monitoring system comprises:
  a portable wireless device.

29. An aircraft as described in claim 22, further comprising:
  an in-flight entertainment unit integrated into said seat element.

30. An aircraft as described in claim 22, wherein said seat processor further comprises:
  logic adapted to generate personalized instructions regarding said operational status of said modular seat options.

31. An aircraft as described in claim 22, wherein said seat processor further comprises:
  logic adapted to sense seat occupation, said logic removing power from nonessential seat options when said seat element is unoccupied.

32. An aircraft as described in claim 22, further comprising:
  a wireless literature tag affixed to aircraft literature stored within said seat element;
  logic adapted to monitor presence of said aircraft literature, said logic integrated into said seat processor; and
  reporting said presence to said central monitoring system.

33. An aircraft as described in claim 22, wherein said seat processor further comprises:
  logic adapted to identify a passenger seated within said seat element.

34. An aircraft as described in claim 33, further comprising:
  a wireless passenger identification tag affixed to a boarding pass; and
  logic adapted to identify said passenger based on said wireless passenger identification tag.

35. An aircraft as described in claim 33, further comprising:
  a vision system integrated into said seat element, said vision system in communication with said electronics control system, said vision system storing a visual identity of said passenger, said electronics control system communicating said visual identity to said central monitoring system.

36. A method of monitoring the status of a plurality of seat options positioned in a plurality of seating elements within a fuselage of an aircraft, the method comprising:
  monitoring an operational status of each of said seat options using an electronic control system positioned within each of said plurality of seating elements;
  communicate said operational status to a central monitoring system via wireless communication;
  receiving a desired status from said central monitoring system;

using said electronic control system to compare said desired status to said operational status of a specific seating element; and generating personalized instructions to change said operational status to said desired status; and using said electronic control system to deliver said personalized instructions to said specific seating element.

37. A method a described in claim 36, further comprising:

receiving a desired status from said central monitoring system using said electronic control stem to compare said desired status to said operational status of a specific seating element; and generating personalized instructions to change said operational status to said desired status; and using said electronic control system to deliver said personalized instructions to said specific seating element.

38. A method as described in claim 36, further comprising:

transmitting a passenger identification signal from a wireless transmitter embedded in a boar pass;

receiving said pass identification signal using said control system;

reporting said passenger identification signal to said central monitoring system via said wireless communication.

39. A method as described in claim 36, further comprising:

monitoring seat occupation in ech seat element using said electronics control system; and removing power from non-essential seat options in each seat element that is unoccupied.

40. A method as described in claim 36, further comprising:

using a vision system embedded in each seat element to record a passenger identification; and reporting said passenger identification to said central monitoring system.

* * * * *